Oct. 23, 1962 R. K. LEE, JR., ETAL 3,060,433
MAGNETIC DISC STORAGE DEVICE
Filed March 28, 1961
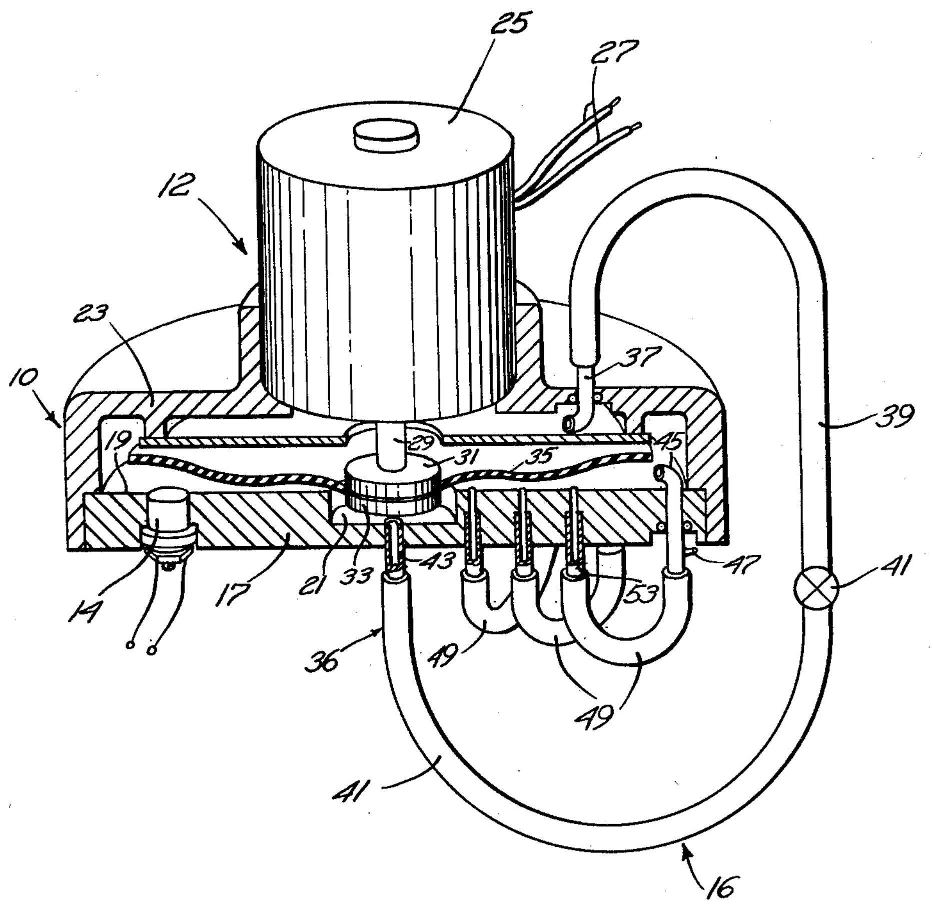
INVENTORS
Roger K. Lee Jr.
BY William J. Gorman
Philip J McFarland
Attorneys United States Patent Office 3,060,433
Patented Oct. 23, 1962

3,060,433

MAGNETIC DISC STORAGE DEVICE

Roger K. Lee, Jr., Watertown, and William J. Gorman, Swampscott, Mass., assignors to Laboratory For Electronics, Inc., Boston, Mass., a corporation of Delaware Filed Mar. 28, 1961, Ser. No. 98,883
6 Claims. (Cl. 346—74)

This invention pertains generally to data processing apparatus and particularly to a magnetic recording device utilizing a flexible storage medium and a plurality of magnetic transducers.

Certain types of magnetic records known to the art operate on the principle that positioning of a number of magnetic transducers with respect to a storage medium may be attained in operation by mounting the transducers in a stabilizing plate and then rotating the storage medium to fix the distance between the recording medium and the transducers. The recording medium may consist of a plastic membrane-like disc, having a magnetizable surface which serves as a magnetic store and is properly spaced from the transducers when the dynamic, elastic and fluid forces on the disc are brought into equilibrium.

A magnetic recorder using a membrane-like disc is shown in the presently co-pending application Serial No. 25,995, entitled "Magnetic Disc Storage Device," filed May 2, 1960, and assigned to the same assignee as the assignee of this application. In the just-cited application, any desired radial distribution of the fluid forces acting on a flexible disc is established and balanced against the dynamic and elastic forces acting on the disc during operation. When an equilibrium between the dynamic, elastic and fluid forces acting on each unit area of the disc exists, the profile, or cross-sectional shape, of the disc approximates an ideal profile, or cross-sectional shape, and each one of a plurality of magnetic transducers radially disposed with respect to the disc operates with substantially equal efficiency.

Although satisfactory results may be obtained following the disclosure of the cited application, it is highly desirable that improved ways be provided to adjust the profile of a flexible disc in a magnetic recorder. Experience has proven, for example, that great care must be taken to ensure the constancy of the elastic and dynamic forces acting on the disc. Otherwise, even relatively small and virtually uncontrollable variations in either the physical characteristics of the disc (which change the elastic forces on the disc) or the speed at which the disc is rotated (which change the dynamic forces on the disc) cause unexpectedly large variations in the cross-sectional shape of the disc during operation. Such variations, of course, in turn are reflected in equally large variations in the spacing between the disc and associated magnetic transducers, resulting in unforseen changes in amplitude of the signal of the latter elements. Such changes in signal amplitude must, in many cases, be compensated by adjustment of the circuitry associated with the transducers and are, in any event, to be avoided whenever possible.

It has also been found that the various forces acting on a flexible disc in a magnetic recorder are inter-related in such an extremely complex manner that a complete redesign is required whenever it is desired to make even minor changes in the profile of the disc, the material of the disc or the speed of rotation of the disc. Obviously, it would be extremely advantageous if means could be provided for adjusting the profile of a flexible disc in operation so as to permit at least moderate changes in any parameter and still attain satisfactory results. Such means would, of course, also minimize the gravity of the problem of variations in the dynamic, elastic or fluid forces mentioned hereinbefore.

Therefore, it is a primary object of this invention to provide a magnetic recorder having self-actuated means for adjusting the spacing between a flexible magnetic disc and a plurality of radially disposed magnetic transducers.

Another object of the invention is to provide a magnetic recorder using a flexible magnetic disc, the cross-sectional shape of the disc being adjustable in operation to compensate for variations in the parameters affecting such cross-sectional shape.

Still another object of this invention is to provide a magnetic recorder incorporating the advantages of the foregoing objects without adding appreciably to the complexity of the device.

These and other objects of the invention are attained generally by disposing a flexible magnetic disc adjacent to a stabilizing plate in which a plurality of radially disposed magnetic transducers are mounted, rotating the disc so as to create a differential in pressure across the two sides thereof, whereby air, or some other fluid, is moved from the central portions of the disc outwardly thereof, and means for recirculating at least a portion of the air arriving at the periphery of the disc so that the distribution of the fluid forces acting on the disc is regulated in accordance with any arbitrarily selected function of the radius of the disc, thereby changing the cross-sectional shape of the disc to adjust the spacing between the magnetic disc and each one of the magnetic transducers.

For a more complete understanding of the invention, reference is now made to the following detailed description of a preferred embodiment of the invention illustrated in the accompanying drawing in which the single FIGURE is a simplified cross-sectional view of a magnetic recorder made in accordance with the invention.

As may be seen in the drawing, the magnetic recorder preferably comprises an enclosure 10 so shaped and adapted as to support a flexible disc positioning and rotating assembly, 12, a number of magnetic transducers 14 (only one of which is shown) and a disc cross-sectional shaping assembly generally indicated by the numeral 16.

The enclosure 10 consists of a base 17 having a substantially flat stabilizing surface, a depression 21 preferably formed centrally of the base 17. The enclosure 10 is completed by a cover 23 attached in any convenient way to the base 17.

The disc positioning and rotating assembly 12 includes an electric motor 25 mounted on the cover 23 and energized through leads 27. The rotor of electric motor 25 is extended to form a shaft 29 to which a pair of flanges 31, 33 are connected to hold a flexible recording disc 35 coaxially in alignment with the depression 21 in the base 17.

The disc cross-sectional shaping assembly 16 comprises an initial pressure regulating system 36 which controls the pressure of any fluid in the depression 21, as described in more detail in the co-pending application of Pearson et al., Serial No. 853,373, filed November 16, 1959, now abandoned. Briefly though, the initial pressure regulating system comprises means, including a fluid inlet 37, a pipe 39, a valve 41 and a fluid outlet 43 whereby a predetermined differential in fluid pressure may, in operation, be established between the environmental fluid within the enclosure 10 and the depression 21. Included in the disc cross-sectional shaping assembly 16 (in addition to the initial fluid pressure regulating system 36) is a fluid pressure regulating system 44 for regulating the fluid pressure gradient radially of the flexible recording disc 35. The just mentioned system includes a plurality of movable fluid inlets 45 disposed adjacent to and outside the periphery of the flexible recording disc 35 and rotatably supported on the base 17. A lever 47 attached to each one of the fluid inlets 45 makes each element adjustable with respect to the periphery of the flexible recording disc 35. A pipe 49 is attached between the outer end of each fluid intake 45. The second side of each pipe 49 in turn is connected to a fluid outlet 53 in the base 17 so as to communicate with the stabilizing surface 19, as illustrated.

In operation, the electric motor 51 is energized to rotate the shaft 29, the flanges 31, 33 and the flexible recording disc 35. Rotation of the flexible disc 35 in turn creates a partial vacuum in the depression 21, causing fluid to flow through the fluid inlet 37, the pipe 39, the valve 41, and thence in to the depression 21, until an equilibrium condition is attained in which condition the dynamic, elastic and fluid pressures operating on the flexible recording disc 35 are balanced. As the flexible recording disc 35 speeds up, or after it has been brought up to its final operating speed, its cross-sectional shape may be adjusted by orienting the fluid intake 45. A closed self adjusting control loop is thus created whereby the amount of fluid intercepted by the fluid intake 45 determines the amount of fluid entering into the fluid stream between the flexible recording disc 35 and the stabilizing surface 19 of the base 17 through the fluid outlet 53. Consequently, the equilibrium condition of the dynamic, elastic and fluid forces acting on each unit area of the flexible recording disc 35 radially outwardly of the opening of the fluid outlet 53 may be fixed by the particular orientation of the fluid intake 45 fixed with respect to the periphery of the flexible recording disc 35. The equilibrium condition of the dynamic, elastic and fluid forces on each unit area of the flexible recording disc 35, in turn, determines the cross-sectional shape, or profile, of that element. Since the individual ones of the magnetic transducers 14 are mounted flush with the surface 19 of the base 17, it follows then that the spacing between each one of the magnetic transducers is dependent upon the cross-sectional shape of the flexible recording disc 35. Further, in view of the teachings of application Serial No. 25,995 cited hereinbefore, it follows that the spacing between each one of the magnetic transducers 14 and the flexible recording disc 35 may be made to increase in proportion to the distance of each transducer from the center of rotation of the disc.

It will become immediately apparent to those having skill in the art that more than one fluid pressure regulating system 44 may be used so as to attain even greater flexibility in the range of adjustment of the cross-sectional shape of the flexible recording disc 35. It will also be recognized that the position of the fluid outlet 53 may be varied at will, either radially of the flexible recording disc 35 along the base 17 or on the side of the disc removed from the surface 19.

In view of the variations of the invention just described and other equally obvious modifications not described, the invention should not be limited to the illustrated embodiment thereof, but rather by the spirit and scope of the appended claims.

What is claimed is:

1. Apparatus for adjusting the cross-sectional shape of a membrane in a fluid comprising a stabilizing plate, means for rotating the membrane in the fluid and close to the stabilizing plate, means adjacent the axis of rotation of the membrane for introducing the fluid at a controlled rate into the space defined by the membrane and one surface of the stabilizing plate to create a fluid stream flowing spirally outwardly along the surface of the membrane, means disposed adjacent the periphery of the membrane in the fluid stream to intercept a predetermined portion thereof, and means for recirculating such intercepted fluid.

2. Apparatus as in claim 1 wherein the fluid is a gas and the second last named means includes means for throttling the gas and the means for recirculating the intercepted gas includes means passing through the surface of the stabilizing plate to introduce the intercepted and throttled gas into the gas stream.

3. A magnetic recorder utilizing a plurality of magnetic transducers coacting with a recording disc rotating in a fluid, each one of the plurality of magnetic transducers being spaced from a surface of the recording disc and at a different distance from the axis of rotation thereof, comprising, a flexible disc having a magnetizable surface, a stabilizing plate, means for coaxially mounting the flexible disc and the stabilizing plate in a fluid, means for mounting each one of the plurality of magnetic transducers flush with the surface of the stabilizing plate facing the magnetizable surface of the flexible disc and at a different distance from the center thereof, means for rotating the flexible disc to generate a fluid flow in a space defined by the magnetizable surface and the stabilizing plate, the direction of fluid flow being spirally outwardly from a central portion of the flexible disc to the periphery thereof and the velocity of the fluid in the flow being a function of distance along the spiral path thereof, and means for recirculating a portion of the moving fluid arriving at the periphery of the flexible disc.

4. A magnetic recorder as in claim 3 wherein the means for recirculating a portion of the moving fluid arriving at the periphery of the flexible disc includes at least one fluid intake disposed adjacent the periphery of the flexible disc, means for orienting the fluid intake with respect to the direction of fluid flow emanating from the space defined by the flexible disc and the stabilizing plate, and means for directing the fluid intercepted by the fluid intake back into the fluid flow.

5. A magnetic recorder as in claim 4 wherein the fluid is a gas.

6. In a magnetic recorder wherein a flexible disc having a magnetizable surface is rotated at a short distance from a stabilizing plate until the dynamic, elastic and fluid forces acting on each unit volume of the flexible disc are in equilibrium to cause the flexible disc to assume a predetermined shape wherein the distance between a surface of the stabilizing plate and the magnetizable surface increases radially of the flexible disc, means for adjusting the fluid pressure gradient radially of the flexible disc, comprising the sub-combination of means for introducing the fluid at a constant pressure through the aperture in the annular stabilizing plate into the space defined by a surface of the stabilizing plate and the magnetizable surface, fluid intake means disposed in the path of the fluid flow adjacent the periphery of the flexible disc, means for throttling the fluid intake means, and means for recirculating the fluid entering the fluid intake means through at least a portion of the space defined by the surface of the stabilizing plate and the magnetizable surface of the flexible disc.

No references cited.